United States Patent [19]

D'Sidocky et al.

[11] Patent Number: 5,696,188
[45] Date of Patent: Dec. 9, 1997

[54] RUBBER COMPOUNDS CONTAINING ARYL BIS CITRACONAMIC ACIDS

[75] Inventors: Richard Michael D'Sidocky, Ravenna; Lawson Gibson Wideman, Tallmadge, both of Ohio

[73] Assignee: The Goodyear Tire & Rubber Company, Akron, Ohio

[21] Appl. No.: 695,049

[22] Filed: Aug. 9, 1996

[51] Int. Cl.$^6$ ............................................. C08K 5/20
[52] U.S. Cl. .................... 524/219; 152/450; 152/525; 152/564
[58] Field of Search .................... 524/219; 152/450, 152/525, 564

[56] References Cited

U.S. PATENT DOCUMENTS

| | | | |
|---|---|---|---|
| 4,433,114 | 2/1984 | Coran et al. | 525/332.6 |
| 5,194,513 | 3/1993 | Wideman et al. | 525/329.3 |
| 5,328,963 | 7/1994 | Muse et al. | 525/282 |

FOREIGN PATENT DOCUMENTS

| | | | |
|---|---|---|---|
| 0476310 | 8/1991 | European Pat. Off. | C08K 5/20 |
| 62-252763 | 11/1987 | Japan . | |
| 9207904 | 5/1992 | WIPO | C08K 5/3415 |
| 9309178 | 5/1993 | WIPO | C08L 7/00 |
| 9322377 | 11/1993 | WIPO | C08K 5/3415 |

*Primary Examiner*—Peter D. Mulcahy
*Attorney, Agent, or Firm*—Bruce J. Hendricks

[57] ABSTRACT

The present invention relates to rubber compounds containing acids of the formulae:

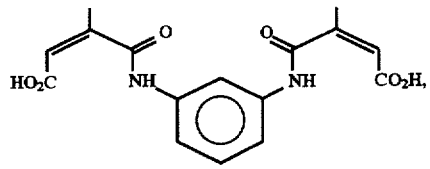

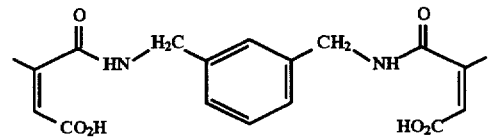

or mixtures thereof.

10 Claims, No Drawings

RUBBER COMPOUNDS CONTAINING ARYL BIS CITRACONAMIC ACIDS

BACKGROUND OF THE INVENTION

PCT Application EP/91/02048 (International Publication No. WO 92/07904) discloses the use of biscitraconimide and bisitaconimide. These materials have use as antireversion coagents for rubber compounds. Unfortunately, production of these materials require a labor-intensive and expensive dehydration step to form the imides.

U.S. Pat. No. 5,328,963 relates to sulfur-vulcanized rubber compositions containing 0.1 to 10 phr of a maleamic acid of the formula

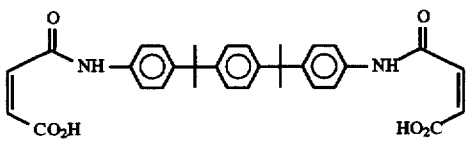

Use of this maleamic acid, however, does not yield the desirable antireversion properties that is sought by those skilled in the art.

SUMMARY OF THE INVENTION

The present invention relates to rubber compounds containing acids of the formulae:

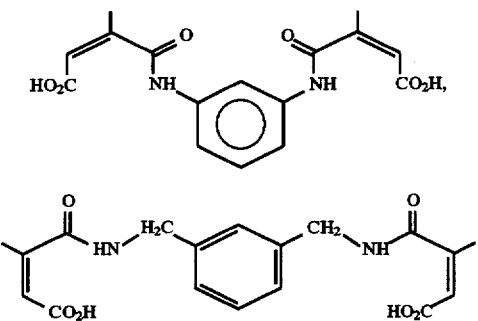

or mixtures thereof.

DETAILED DESCRIPTION OF THE PREFERRED EMBODIMENT

The acids used in the present invention may be present at various levels in the rubber compounds of the present invention. For example, the level may range from about 0.1 to 10.0 by weight per 100 parts of rubber (also known as "phr"). Preferably, the level ranges from about 0.5 to about 5.0 phr.

The acids may be prepared by condensing m-phenylene diamine or m-xylylene diamine with citraconic anhydride to form N,N'-(m-phenylene)bis citraconamic acid or N,N'-(m-xylylene)bis citraconamic acid. Mixtures of the two diamines may be used to form a mixture of the two acids.

The citraconic anhydride is reacted with the m-phenylene diamine or m-xylylene diamine under suitable conditions to form the N,N'-(m-phenylene)bis citraconamic acid or N,N'-(m-xylylene)bis citraconamic acid. The anhydride may be reacted with the diamine compound in a variety of mole ratios. Generally, the mole ratio of the anhydride to the diamine compound ranges from about 2.5:1 to about 0.75:1 with a range of from about 2.1:1 to about 1.9:1 being preferred.

An organic solvent may be used to dissolve the anhydride or diamine compound. The solvent is preferably inert to the reaction between the anhydride and the diamine compound. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; acetone; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the diamine or anhydride compound and not interfere with the reaction.

The reaction between the anhydride and the diamine compound to form the aryl bis citraconamic acid may be conducted over a wide temperature range. The temperature may range from moderate to an elevated temperature. In general, the reaction may be conducted at a temperature of between about 20° C. to 100° C. The preferred temperature range is from about 30° C. to 80° C., while the most preferred temperature range is from about 55° C. to 65° C.

The reaction to form the aryl his citraconamic acid may be conducted under a variety of pressures. Pressures ranging from about 0 psig to 100 psig may be used.

The process for the preparation of the aryl bis citraconamic acid may be carried out in a batch, semi-continuous or continuous manner. The reaction may be conducted in a single reaction zone or in a plurality or reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc. are all illustrative of the types of agitation means which are contemplated for use in preparing the composition of the present invention. Such agitation means are available and well known to those skilled in the art.

The use of the aryl bis citraconamic acids improve the rheometer antireversion properties of "sulfur-vulcanized elastomers or rubbers." The term "sulfur-vulcanized elastomer or rubber" as used herein embraces both vulcanized forms of natural and all its various raw and reclaim forms as well as various synthetic rubbers. The synthetic elastomers include conjugated diene homopolymers and copolymers and copolymers of at least one conjugated diene and aromatic vinyl compound. Representative synthetic polymers include the homopolymerization products of butadiene and its homologues and derivatives, as for example, methylbutadiene, dimethylbutadiene and pentadiene as well as copolymers, such as those formed from butadiene or its homologues or derivatives with other unsaturated organic compounds. Among the latter are acetylenes, for example, vinyl acetylene; olefins, for example, isobutylene, which copolymerizes with isoprene to form butyl rubber; vinyl compounds, for example, acrylic acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-cis-polyisoprene and similar synthetic rubbers.

Specific examples of synthetic rubbers include neoprene (polychloroprene), polybutadiene (including trans- and cis-1,4-polybutadiene), polyisoprene (including cis-1,4-polyisoprene), butyl rubber, copolymers of 1,3-butadiene or isoprene with monomers such as styrene, acrylonitrile and methyl methacrylate as well as ethylene/propylene terpolymers, also known as ethylene/propylene/diene monomer (EPDM) and, in particular, ethylene/propylene/dicyclopentadiene terpolymers and styrene/isoprene/butadiene rubber. The preferred synthetic rubbers for use in the present invention are polybutadiene, polyisobutylene, butadiene-styrene copolymers and cis,1,4-polyisoprene.

Vulcanization of the rubber compound of the present invention is generally carried out at conventional temperatures ranging from about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the citraconamic acids, other rubber additives may also be incorporated in the rubber compound. The additives commonly used in rubber vulcanizates are, for example, carbon black, tackifier resins, processing aids, antioxidants, antiozonants, stearic acid, activators, waxes, phenol-formaldehyde resins, oils and peptizing agents. As known to those skilled in the art, depending on the intended use of the rubber compound, certain additives mentioned above are commonly used in conventional amounts. Typical additions of carbon black comprise about 20 to 100 parts by weight of diene rubber (phr), preferably 30 to 80 phr. Typical amounts of tackifier resins comprise about 1 to 5 phr. Typical amounts of antioxidants comprise 1 to about 10 phr. Typical amounts of antiozonants comprise 1 to about 10 phr. Typical amounts of stearic acid comprise 1 to about 2 phr. Typical amounts of zinc oxide comprise 2 to 5 phr. Typical amounts of waxes comprise 1 to 5 phr. Typical amounts of phenol-formaldehyde resins comprise 1 to 8 phr. Typical amounts of oils comprise 5 to 40 phr. Typical amounts of peptizers comprise 0.1 to 1 phr. The presence and relative amounts of the above additives are not an aspect of the present invention.

The vulcanization of the rubber compound is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to 8 phr with a range of from 1.0 to 2.25 being preferred.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thiophthalimides, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The rubber compounds containing the N,N'-(m-phenylene)bis citraconamic acids or N,N'-(m-xylylene)bis citraconamic acid may be used in the preparation of and therefor in the form of composite products including tires, power belts, conveyor belts, printing rolls, rubber shoe heels and soles, rubber wringers, automobile floor mats, mud flaps for trucks, ball mill liners, and the like. Preferably, the rubber vulcanizates are used in sidewall, carcass ply or overlay compounds for tires.

The following examples are presented in order to illustrate but not limit the present invention.

Example 1

Preparation of N,N'-(m-phenylene)bis Citraconamic Acid

A 3-liter, 3-neck round bottom flask was charged with 54 g (0.5 mole) of m-phenylenediamine and 500 ml of reagent acetone and flushed with nitrogen. The flask was fitted with a reflux condenser, mechanical stirrer and thermocouple. The solution was stirred as 112 g (1.0 mole) of citraconic anhydride in 500 ml of reagent acetone was added dropwise over about 1½ hours as the temperature was allowed to rise to reflux the acetone. The reaction mixture was refluxed for an additional hour, cooled to room temperature and suction filtered to give 166 g of N,N'-(m-phenylene)bis citraconamic acid as shown by NMR analysis, as a tan mustard-colored solid melting at 152°–156° C.

Example 2

Preparation of N,N'-(m-xylylene)bis Citraconamic Acid

A 2.5-liter glass resin kettle was charged with 136.2 g (1.0 mole) of m-xylylenediamine and 2000 ml of reagent acetone and flushed with nitrogen. The kettle was fitted with a dropping funnel, reflux condenser, mechanical stirrer and thermocouple. The addition funnel was charged with 246 g (2.2 moles) of citraconic anhydride which was slowly added over a 2½-hour period, with stirring and refluxing the acetone. The reaction mixture was allowed to cool to room temperature with stirring. Suction filtering and acetone wash of the solid product (air-drying) gives a 246 g of a tan powder, melting at 148°–150° C. The structure was confirmed by NMR analysis.

Example 3

Physical Testing

Table I below shows the basic rubber compound that was used in this example. The rubber compound was prepared in a three-stage Banbury mix. All parts and percentages are by weight unless otherwise noted. The cure data as well as other physical data for each sample are listed in Tables II, III and IV.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected.

The following Tables II, III and IV report cure properties that were determined from cure curves that were obtained for the two rubber formulations that were prepared. These properties include torque maximum (Max Tq), torque minimum (Min Tq), delta torque (DEL Tq), minutes to 1 point of the torque increase (T1), minutes to 25 percent of the torque increase (T25 minutes) and minutes to 90 percent of the torque increase (T90 minutes).

Cure reversion measured using a rheometer can be defined as the incremental time required for a fixed decrease in torque from the maximum value, expressed here for example as Smax-1pt (time for the torque to decrease 1.0 unit or point below the maximum value Max Tq). Such cure reversion measurements are defined by G M Bristow (NR Technology, 17 (1) 7, 1986).

Shore Hardness was determined in accordance with ASTM-1415.

In Table IV, the various properties of the samples are reported which were cured for 20 minutes at 150° C., 90 minutes at 150° C., 6 minutes at 170° C. or 28 minutes at 170° C.

TABLE I

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| Nonproductive A | | | | | | | | |
| Natural Rubber | 100 | 100 | 100 | 100 | 100 | 100 | 100 | 100 |
| Carbon Black | 30 | 30 | 30 | 30 | 30 | 30 | 30 | 30 |
| Oil | 5 | 5 | 5 | 5 | 5 | 5 | 5 | 5 |
| Nonproductive B | | | | | | | | |
| Carbon Black | 10 | 10 | 10 | 10 | 10 | 10 | 10 | 10 |
| Fatty Acid | 2 | 2 | 2 | 2 | 2 | 2 | 2 | 2 |
| Zinc Oxide | 3 | 3 | 3 | 3 | 3 | 3 | 3 | 3 |
| Productive | | | | | | | | |
| Amine Antioxidant | 0.75 | 0.75 | 0.75 | 0.75 | 0.75 | 0.75 | 0.75 | 0.75 |
| Sulfur | 2.25 | 2.25 | 2.25 | 2.25 | 2.25 | 2.25 | 2.25 | 2.25 |
| N-cyclohexyl-2-benzothiazyl-sulfenamide | 1.0 | 1.0 | 1.0 | 1.0 | 1.0 | 1.0 | 1.0 | 1.0 |
| N-(cyclohexylthio)phthalimide | 0.1 | 0.1 | 0.1 | 0.1 | 0.1 | 0.1 | 0.1 | 0.1 |
| N,N'-(m-phenylene)bis citraconamic acid | | 4.1 | | | | 4.1 | | |
| N,N'-(m-phenylene)bis maleamic acid | | | 4.1 | | | | 3.72 | |
| Bis 1,4-(p-anilino-alpha,alpha'-dimethyl)p-xylene-bis maleamic acid | | | | 4.1 | | | | 6.9 |
| mmols of acid | | 13.5 | | | | 13.5 | 13.5 | 13.5 |

TABLE II

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| phr of acid Rheometer @ 150° C. | | 4.1 | 4.1 | 4.1 | | 4.1 | 3.72 | 6.9 |
| Max Tq (DN.M) | 38 | 36.5 | 31.5 | 34 | 38 | 36.5 | 32 | 33 |
| Min Tq (DN.M) | 5 | 5 | 5.5 | 5.5 | 5 | 5 | 5.5 | 5.5 |
| Del Tq (DN.M) | 33 | 31.5 | 26 | 28.5 | 33 | 31.5 | 26.5 | 27.5 |
| Time to Max Tq (min) | 20 | 25 | 33 | 26.5 | 20 | 25 | 33.5 | 30 |
| T 1pt Rise, Min | 6.5 | 5 | 6 | 5.5 | 6.5 | 5 | 5.5 | 6.8 |
| T25 (Min) | 8.5 | 7.5 | 8.5 | 8.5 | 8.5 | 7.5 | 8 | 9 |
| T90 (Min) | 13.5 | 17 | 19 | 16 | 13.5 | 17 | 18.5 | 19 |
| Reversion (min/pt drop) | | | | | | | | |
| Smax-1 pt | 7 | 35 | 15.5 | 7 | | | 21.5 | 23 |
| Smax-2 pt | 12 | 87 | 29.5 | 12 | | | 58.5 | 50 |
| Smax-3 pt | 18 | | 53.5 | 18 | | | | |
| Smax-4 pt | 25 | | 93.5 | 25 | | | | |
| Smax-5 pt | 32 | | | 32 | | | | |
| Smax-6 pt | 41 | | | 41 | | | | |

TABLE II-continued

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| Smax-7 pt | 55 | | | | 55 | | | |
| Smax-8 pt | 73 | | | | 73 | | | |
| Smax-9 pt | 100 | | | | 100 | | | |
| Maximum Reversion/Time | | | | | | | | |
| Pt drop | −9 | −0.5 | −2 | −4 | −9 | −0.5 | −2.5 | −2.5 |
| Time (min) | 100 | 27 | 87 | 93.5 | 100 | 27 | 86.5 | 90 |

TABLE III

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| phr of acid | | 4.1 | 4.1 | 4.1 | | 4.1 | 3.72 | 6.9 |
| Rheometer @ 170° C. | | | | | | | | |
| Max Tq (DN.M) | 36.5 | 34 | 30 | 31.5 | 36.5 | 34 | 30.5 | 30.5 |
| Min Tq (DN.M) | 5 | 5 | 5 | 5 | 5 | 5 | 5 | 6 |
| Del Tq (DN.M) | 31.5 | 29 | 25 | 26.5 | 31.5 | 29 | 25.5 | 24.5 |
| Time to Max Tq (min) | 6 | 7.5 | 9 | 8 | 6 | 7.5 | 9 | 8.5 |
| T25 (Min) | 3 | 3 | 3 | 3 | 3 | 3 | 2.5 | 2.8 |
| T90 (Min) | 4.5 | 5.2 | 6 | 5 | 4.5 | 5.2 | 5.5 | 5.5 |
| Reversion (min/pt drop) | | | | | | | | |
| Smax-1 pt | 1.5 | 3.5 | 3 | 2.5 | 1.5 | 3.5 | 4 | 4 |
| Smax-2 pt | 2.5 | 8.5 | 6 | 4.5 | 2.5 | 8.5 | 7 | 6.5 |
| Smax-3 pt | 3 | | 10 | 6.5 | 3 | | 11 | 10.5 |
| Smax-4 pt | 5 | | 15 | 9.5 | 5 | | 16 | 17.5 |
| Smax-5 pt | 6 | | 28 | 14 | 6 | | 26 | 31.5 |
| Smax-6 pt | 7 | | | 22 | 7 | | | |
| Smax-7 pt | 8.5 | | | 41 | 8.5 | | | |
| Smax-8 pt | 10.5 | | | | 10.5 | | | |
| Smax-9 pt | 12.5 | | | | 12.5 | | | |
| Smax-10 pt | 16 | | | | 16 | | | |
| Smax-11 pt | 20 | | | | 20 | | | |
| Smax-12 pt | 25.5 | | | | 25.5 | | | |
| Smax-13 pt | 36 | | | | 36 | | | |
| Smax-14 pt | 60 | | | | 60 | | | |
| Maximum Reversion/Time | | | | | | | | |
| Pt drop | −14.5 | −2 | −5.5 | −7 | −14.5 | −2 | −5.5 | −5.5 |
| Time (min) | 114 | 8.5 | 49 | 41 | 114 | 8.5 | 44 | 54.5 |

TABLE IV

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| 300% Modulus | | | | | | | | |
| 20'/150° C. (MPa) | 12.53 | 11.65 | 9.68 | 10.25 | 12.53 | 11.65 | 10.12 | 9.57 |
| 90'/150° C. (MPa) | 8.89 | 12.96 | 9.27 | 8.87 | 8.89 | 12.96 | 9.69 | 9.17 |
| 6'/170° C. (MPa) | 11.78 | 10.95 | 9.12 | 9.28 | 11.78 | 10.95 | 9.75 | 8.69 |
| 28'/170° C. (MPa) | 7.07 | 11.19 | 8.02 | 7.6 | 7.07 | 11.19 | 8.27 | 7.62 |
| Tensile Strength | | | | | | | | |
| 20'/150° C. (MPa) | 23.32 | 21.74 | 19.45 | 20.51 | 23.32 | 21.74 | 20.08 | 18.34 |
| 90'/150° C. (MPa) | 17.06 | 19.26 | 15.55 | 16.74 | 17.06 | 19.26 | 16.16 | 15.86 |
| 6'/170° C. (MPa) | 22.01 | 21.22 | 18.9 | 18.88 | 22.01 | 21.22 | 19.28 | 16.88 |
| 28'/170° C. (MPa) | 14.02 | 17.69 | 13.99 | 14.01 | 14.02 | 17.69 | 14.37 | 14.71 |
| Elongation at Break | | | | | | | | |
| 20'/150° C. (%) | 511 | 505 | 513 | 523 | 511 | 505 | 518 | 504 |
| 90'/150° C. (%) | 490 | 432 | 459 | 496 | 490 | 432 | 455 | 469 |
| 6'/170° C. (%) | 495 | 516 | 520 | 517 | 495 | 516 | 508 | 497 |
| 28'/170° C. (%) | 488 | 443 | 464 | 481 | 488 | 443 | 459 | 499 |

TABLE IV-continued

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| Shore A Hardness, 100° C. | | | | | | | | |
| 20'/150° C. | 56.7 | 56.5 | 51.4 | 55 | 56.7 | 56.5 | 51.9 | 55.3 |
| 90'/150° C. | 47.5 | 58.6 | 50 | 52.1 | 47.5 | 58.6 | 50.6 | 55 |
| 6'/170° C. | 54.1 | 55.8 | 50.5 | 54.7 | 54.1 | 55.8 | 52.1 | 53.5 |
| 28'/170° C. | 43.5 | 55.2 | 48.9 | 49 | 43.5 | 55.2 | 47.6 | 49.9 |
| Rebound, 100° C. | | | | | | | | |
| 20'/150° C. (%) | 71.8 | 65.8 | 66.6 | 65.8 | 71.8 | 65.8 | 67 | 62.9 |
| 90'/150° C. (%) | 63.2 | 65.1 | 61.7 | 59 | 63.2 | 65.1 | 61.2 | 57.4 |
| 6'/170° C. (%) | 71 | 65.9 | 66.4 | 65.5 | 71 | 65.9 | 67.9 | 63.8 |
| 28'/170° C. (%) | 58.6 | 62.3 | 58.4 | 55 | 58.6 | 62.3 | 59.8 | 53.9 |

Goodrich Blow Out (ASTM D623)
Stroke 6.35 mm Cyclic comp 800.00 1/min Preheat tmp 93° C. Preheat time 15.00 min
Blowout time or 60 min Load on Sample 20.18 kg

| Sample No. | 1 Ctrl | 2 | 3 Ctrl | 4 Ctrl | 5 Ctrl | 6 | 7 Ctrl | 8 Ctrl |
|---|---|---|---|---|---|---|---|---|
| Fall Time (Min) | | | | | | | | |
| 20'/150° C. | 17 | 17 | 10 | 7 | 17 | 17 | 9 | 7 |
| 55'/150° C. | 8 | no failure | 7 | 10 | 8 | no failure | 9 | |
| 90'/150° C. | 8 | no failure | 7 | 5 | 8 | no failure | 7 | 8 |
| 6'/170° C. | 12 | 21 | 6 | 7 | 12 | 21 | 8 | 5 |
| 17'/170° C. | 5 | no failure | 7 | 4 | 5 | no failure | 5 | 4 |
| 28'/170° C. | 5 | no failure | 4 | 4 | 5 | no failure | 5 | 4 |
| Max Temp Rise (°C.) | | | | | | | | |
| 20'/150° C. | 157 | 149 | 157 | 156 | 157 | 149 | 157 | 154 |
| 55'/150° C. | 154 | 129 | 152 | 178 | 154 | 129 | 153 | 154 |
| 90'/150° C. | 163 | 121 | 153 | 153 | 163 | 121 | 152 | 177 |
| 6'/170° C. | 193 | 154 | 149 | 156 | 193 | 154 | 156 | 156 |
| 17'/170° C. | 157 | 129 | 168 | 161 | 157 | 129 | 157 | 157 |
| 28'/170° C. | 154 | 121 | 154 | 154 | 154 | 121 | 154 | 157 |

Tables II and III compare the reversion-resistant behavior at 150° C. and 170° C., respectively, for N,N'-(m-phenylene) bis citraconamic acid (Sample 2), N,N'-(m-phenylene)bis maleamic acid (Ctrl 3) and bis 1,4-(p-anilino-alpha,alpha'-dimethyl)p-xylene-bis maleamic acid (Ctrl 4) at equal part (by weight) levels versus (Ctrl 1) which has no bis-acid added to the compound formulation of Table I. When examining Table II (150° C. cure) and Table III (170° C.), it was surprising that N,N'-(m-phenylene)bis citraconamic acid (Sample 2) provides excellent reversion-resistant behavior when compared to Ctrl 1 which has no bis-acid added to the compound formulation and likewise is superior to other bis-acids such as N,N'-(m-phenylene)bis maleamic acid (Ctrl 3) and bis 1,4-(p-anilino-alpha,alpha'-dimethyl)p-xylene-bis maleamic acid (Ctrl 4). At the 150° C. cure temperature, Ctrl 1 had a maximum reversion of −9 pts, Ctrl 3 a maximum reversion of −2 pts and Ctrl 4 a maximum reversion −4 pts while N,N'-(m-phenylene)bis citraconamic acid (Sample 2) showed a maximum reversion of only −0.5 pt. Comparison of reversion behavior at 170° C. (Table III) likewise shows the reversion-resistant superiority of N,N'-(m-phenylene)bis citraconamic acid (Sample 2). Thus, while Ctrl 1 had a maximum reversion of −14.5 pts, and Ctrl 3 and Ctrl 4 showed maximum reversions of −5.5 pts and −7 pts, respectively, N,N'-(m-phenylene)bis citraconamic acid (Sample 2) of the present invention showed a maximum reversion of only −2 pts.

The bis-acids discussed in this invention were likewise compared at equal molar levels in Tables II and III (13.5 mmols) to compensate for any molecular weight differences. At the equal molar concentrations, N,N'-(m-phenylene)bis citraconamic acid (Sample 6) of the present invention again is shown superior in promoting reversion resistance versus Ctrl 5 (no bis-acid present), N,N'-(m-phenylene)maleamic acid (Ctrl 7) and bis 1,4-(p-anilino-alpha,alpha'-dimethyl)p-xylene-bis maleamic acid (Ctrl 8).

From the results of Tables II and III, it is clear that N,N'-(m-phenylene)bis citraconamic acid also provides improved properties to the final vulcanizate. Thus, use of N,N'-(m-phenylene)bis citraconamic acid showed improvements in retention of modulus during overcure and with increasing cure temperature, improvements in retention of tensile strength, improvements in retention of hardness and improvements in retention of rebound properties. Reduction in heat buildup along with extended times to sample failure or no failure at all was also observed for Goodrich Blowout testing when N,N'-(m-phenylene)bis citraconamic acid was utilized as part of the compound formulation.

Example 4

Physical Testing

Table V below shows the basic rubber compound that was used in this example. The rubber compound was prepared in a three-stage Banbury mix. All parts and percentages are by weight unless otherwise noted. The cure data as well as other physical data for each sample are listed in Tables VI, VII and VIII.

TABLE V

| Sample No. | 9 Ctrl | 10 | 11 |
|---|---|---|---|
| Nonproductive A | | | |
| Oil | 5 | 5 | 5 |
| Natural Rubber | 100 | 100 | 100 |
| Carbon Black | 30 | 30 | 30 |

TABLE V-continued

| Sample No. | 9 Ctrl | 10 | 11 |
|---|---|---|---|
| Nonproductive B | | | |
| | 135 | 135 | 135 |
| Steric Acid | 2 | 2 | 2 |
| Zinc oxide | 3 | 3 | 3 |
| Carbon Black | 10 | 10 | 10 |
| Productive | | | |
| | 150 | 150 | 150 |
| N-cyclohexyl-2-benzothiazyl-sulfenamide | 1.0 | 1.0 | 1.0 |
| N-(cyclohexylthio)phthalimide | 0.1 | 0.1 | 0.1 |
| Amine Antioxidant | 0.75 | 0.75 | 0.75 |
| N,N'-(m-xylylene)bis citraconamic Acid | | 2.2 | 3.31 |
| Sulfur | 2.25 | 2.25 | 2.25 |
| TOTAL | 154.1 | 156.1 | 157.41 |

TABLE VI

| Sample No. | 9 Ctrl | 10 | 11 |
|---|---|---|---|
| PHR of acid | 0 | 2.2 | 3.31 |
| Rheometer @ 150° C. | | | |
| Max Tq (DN.M) | 40 | 40.5 | 39.5 |
| Min Tq (DN.M) | 5 | 5 | 5 |
| Del Tq (DN.M) | 35 | 35.5 | 34.5 |
| Time to Max Tq | 18 | 22 | 23.5 |
| T 1pt Rise, (Min) | 5.5 | 5.2 | 5.5 |
| T25 (Min) | 8 | 7.5 | 7.5 |
| T90 (Min) | 12 | 14 | 14 |
| Reversion (min/pt drop) | | | |
| Smax-1 pt | 7 | 18 | 21.5 |
| Smax-2 pt | 12.5 | 40 | |
| Smax-3 pt | 14 | 98 | |
| Smax-4 pt | 24 | | |
| Smax-5 pt | 31 | | |
| Smax-6 pt | 39 | | |
| Smax-7 pt | 50 | | |
| Smax-8 pt | 62 | | |
| Smax-9 pt | 80 | | |
| Smax-10 pt | 102 | | |
| Maximum Reversion/Time | | | |
| Pt Drop | −10 | −3 | −1.5 |
| Time (min) | 102 | 98 | 40.5 |

TABLE VIII

| Sample No. | 9 Ctrl | 10 | 11 |
|---|---|---|---|
| PHR of acid | | 2.2 | 3.31 |
| Rheometer @ 170° C. | | | |
| Max Tq (DN.M) | 37 | 37.5 | 36.5 |
| Min Tq (DN.M) | 5 | 5 | 4.5 |
| Del Tq (DN.M) | 32 | 32.5 | 32 |
| Time to Max Tq | 5.5 | 6 | 6 |
| T25 (Min) | 2.2 | 2.5 | 2.5 |
| T90 (Min) | 4 | 4.2 | 4.5 |
| Reversion (min/pt drop) | | | |
| Smax-1 pt | 1.5 | 2.5 | 2.5 |
| Smax-2 pt | 2.5 | 4.5 | 4.5 |
| Smax-3 pt | 4 | 7 | 7 |
| Smax-4 pt | 5 | 9.5 | 10 |
| Smax-5 pt | 6.5 | 14 | |
| Smax-6 pt | 7.5 | 21 | |
| Smax-7 pt | 9 | | |
| Smax-8 pt | 10 | | |
| Smax-9 pt | 12 | | |
| Smax-10 pt | 14.5 | | |
| Smax-11 pt | 18.5 | | |
| Smax-12 pt | 23.5 | | |
| Smax-13 pt | 28.5 | | |
| Smax-14 pt | 37.5 | | |
| Smax-15 pt | 54.5 | | |
| Smax-16 pt | 11.5 | | |
| Maximum Reversion/Time | | | |
| Pt Drop | −16 | −6.5 | −4.5 |
| Time (min) | 114.5 | 32 | 18 |

TABLE VIII

| Sample No. | 9 Ctrl | 10 | 11 |
|---|---|---|---|
| PHR of acid | | 2.2 | 3.31 |
| 300% Modulus | | | |
| 20'/150° C. | 12.83 | 13.5 | 13.16 |
| 55'/150° C. | 10.25 | 12.6 | 12.24 |
| 90'/150° C. | 9.19 | 12.47 | 12.52 |
| 6'/170° C. | 11.9 | 12.56 | 12.41 |
| 17'/170° C. | 8.03 | 10.14 | 10.2 |
| 28'/170° C. | 6.92 | 10.39 | 10.28 |
| Tensile Strength (MPa) | | | |
| 20'/150° C. | 20.77 | 22.18 | 21.18 |
| 55'/150° C. | 19.38 | 18.03 | 19.68 |
| 90'/150° C. | 16.97 | 18.86 | 18.14 |
| 6'/170° C. | 22.68 | 21.43 | 21.28 |
| 17'/170° C. | 16.23 | 16.81 | 16.37 |
| 28'/170° C. | 13.9 | 17.08 | 14.67 |
| Elongation at Break (%) | | | |
| 20'/150° C. | 450 | 466 | 458 |
| 55'/150° C. | 488 | 416 | 456 |
| 90'/150° C. | 478 | 432 | 424 |
| 6'/170° C. | 509 | 472 | 482 |
| 17'/170° C. | 500 | 452 | 447 |
| 28'/170° C. | 489 | 447 | 410 |
| Shore A Hardness, 100° C. | | | |
| 20'/150° C. | 56.6 | 58.5 | 59.1 |
| 55'/150° C. | 51 | 57.6 | 58.5 |
| 90'/150° C. | 50.1 | 56.7 | 58 |
| 6'/170° C. | 54.7 | 56.3 | 56.1 |
| 17'/170° C. | 46.6 | 51.6 | 52.7 |
| 28'/170° C. | 41.5 | 52 | 51.7 |
| Rebound, 100° C. (%) | | | |
| 20'/150° C. | 71.4 | 70.6 | 67.8 |
| 55'/150° C. | 66.9 | 65.9 | 64.5 |
| 90'/150° C. | 63.2 | 64.9 | 64.9 |
| 6'/170° C. | 71.7 | 68.7 | 69.2 |
| 17'/170° C. | 62 | 62.6 | 62.3 |
| 28'/170° C. | 58.2 | 61.5 | 62 |
| Goodrich Blow Out (same conditions as in Table IV) | | | |
| Fail Time | Min | | |
| 20'/150° C. | 13 | 19 | 25 |
| 55'/150° C. | 10 | 27 | 50 |
| 90'/150° C. | 10 | 31 | no failure |
| 6'/170° C. | 11 | 15 | 23 |
| 17'/170° C. | 6 | 20 | 44 |
| 28'/170° C. | 7 | 17 | no failure |
| Max Temp Rise (°C.) | | | |
| 20'/150° C. | 149 | 142 | 146 |

TABLE VIII-continued

| Sample No. | 9 Ctrl | 10 | 11 |
|---|---|---|---|
| 55'/150° C. | 152 | 143 | 141 |
| 90'/150° C. | 154 | 146 | 132 |
| 6'/170° C. | 159 | 149 | 153 |
| 17'/170° C. | 160 | 149 | 154 |
| 28'/170° C. | 159 | 146 | 135 |

Tables VI, VII and VIII compare the reversion-resistant behavior at 150° C. and 170° C., respectively, for N,N'-(m-xylylene)bis citraconamic acid (Samples 10 and 11) versus (Ctrl 9) which has no bis-acid added to the compound formulation of Table V. It is immediately obvious when examining Table VI (150° C. cure) and Table VII (170° C.) that N,N'-(m-xylylene)bis citraconamic acid (Samples 10 and 11) provides excellent reversion-resistant behavior when compared to Ctrl 9 which has no bis-acid added to the compound formulation. At the 150° C. cure temperature, Ctrl 9 had a maximum reversion of −10 pts while N,N'-(m-xylylene)bis citraconamic acid (Samples 10 and 11) showed maximum reversions of only −3 pts and −1.5 pts, respectively. Comparison of reversion behavior at 170° C. (Table VII) likewise shows the reversion-resistant superiority of N,N'-(m-xylylene)bis citraconamic acid (Samples 10 and 11) of the present invention. Thus, while Ctrl 9 had a maximum reversion of −16 pts, N,N'-(m-xylylene)bis citraconamic acid (Samples 10 and 11) of the present invention showed a maximum reversion of only −6.5 pts and −4.5 pts, respectively.

From the results of Table VIII, it is clear that of N,N'-(m-xylylene)bis citraconamic acid also provides improved properties to the final vulcanizate. Thus, N,N'-(m-xylylene) bis citraconamic acid of the present invention showed improvements in retention of modulus during overcure and with increasing cure temperature, improvements in retention of tensile strength, improvements in retention of hardness and improvements in retention of rebound properties. Reduction in heat buildup along with extended times to sample failure or no failure at all was also observed for Goodrich Blowout testing when N,N'-(m-xylylene)bis citraconamic acid of the present invention was utilized as part of the compound formulation.

What is claimed is:

1. A vulcanized rubber composition comprising a sulfur-vulcanized rubber and from 0.1 to 10 phr of a substituted bis citraconamic acid of the formulae:

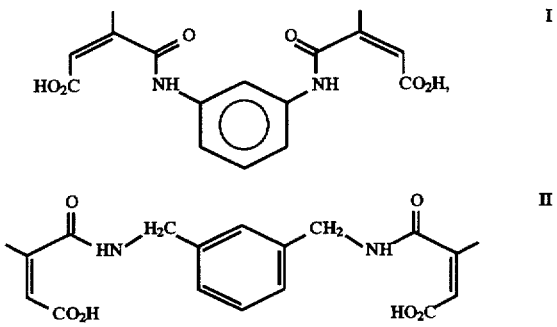

or mixtures thereof.

2. The rubber composition of claim 1 wherein said rubber is selected from the group consisting of a natural rubber and synthetic elastomer selected from conjugated diene homopolymers and copolymers and from copolymers of at least one conjugated diene and aromatic vinyl compound.

3. The rubber composition of claim 2 wherein said rubber is selected from the group consisting of natural rubber, polychloroprene, synthetic 1,4-cis-polyisoprene, butyl rubber, polybutadiene, styrene-butadiene copolymer, isoprene-butadiene copolymer, styrene-isoprene-butadiene rubber, methyl methacrylate-butadiene copolymer, isoprene-butadiene copolymer, methyl methacrylate-isoprene copolymer, acrylonitrile-isoprene copolymer, acrylonitrile-butadiene copolymer, EPDM and mixtures thereof.

4. The rubber composition of claim 1 wherein from 0.5 to about 5.0 phr of said substituted bis citraconamic acid is present.

5. The rubber composition of claim 1 wherein the substituted bis citraconamic acid of formula I is used.

6. The rubber composition of claim 1 wherein the substituted bis citraconamic acid of formula II is used.

7. The rubber composition of claim 1 in the form of a composite product.

8. The rubber composition of claim 1 wherein said composite product is selected from the group consisting of tires, power belts, conveyor belts, printing rolls, rubber shoe heels and soles, rubber wringers, automobile floor mats, mud flaps and ball mill liners.

9. The rubber composition of claim 8 wherein said composite product is a tire.

10. The rubber composition of claim 9 wherein said rubber composition is used as sidewall, carcass ply or overlay compounds.

* * * * *